United States Patent Office 3,251,825
Patented May 17, 1966

3,251,825
PROCESS FOR THE PRODUCTION OF WATER-SOLUBLE MIXED CELLULOSE ALLYL ETHERS WHICH CAN BE CROSS-LINKED
Ingo Haidasch, Wiesbaden, and Julius Voss, Wiesbaden-Biebrich, Germany, assignors to Kalle Aktiengesellschaft, Wiesbaden-Biebrich, Germany, a corporation of Germany
No Drawing. Filed July 17, 1961, Ser. No. 124,374
Claims priority, application Germany, July 21, 1960, K 41,253
12 Claims. (Cl. 260—231)

Cellulose ethyl allyl ethers have been produced of decomposed alkali cellulose. Most of these products are soluble only at temperatures below +5° C.; the products which are soluble at room temperature have insufficient cross-linking properties owing to their low allyl content. Cellulose carboxy methyl allyl ethers also known in the art have the disadvantage of being precipitated by heavy metal ions.

A process for the preparation of mixed cellulose allyl ethers which can be cross-linked and have a relatively high viscosity has now been found which is characterized in that alkali cellulose is reacted in a heterogeneous phase with a low alkyl halide, a low oxalkylating agent and an allyl halide, either simultaneously or in any order desired, preferably at a raised temperature and, if desired, in the presence of an organic solvent.

An alkali cellulose suitable for the process of the present invention is prepared in known manner, e.g. by soaking cellulose in aqueous alkalis, particularly 15 to 50 percent (by weight) sodium hydroxide and subsequent squeezing out, or by mixing pulverized cellulose with the calculated quantity of aqueous alkali in a suitable mixer. It is also possible to disperse the cellulose in an aqueous organic solvent and mix it with aqueous or dry alkali. Based on the total consumption of alkali, well soluble mixed ethers are produced according to the invention if the alkali cellulose contains 1 to 10 moles of alkali per mole of cellulose and not more than 15 moles of water per mole of alkali. The whole quantity of alkali necessary can be admixed to the cellulose at the beginning or only a portion of the alkali can be added first and the remaining quantity during the reaction in one or several portions.

As alkyl group preferably a methyl group is used which is introduced by reaction of the alkali cellulose with methyl chloride or methyl bromide. Other lower alkyl groups such as the ethyl or propyl group may be introduced in an analogous manner by reaction with the appropriate alkyl chloride or alkyl bromide.

As allylating agent an allyl halide, preferably allyl bromide or allyl chloride, is used.

The introduction of the oxalkyl group can be effected in known manner by various means: either compounds containing an alkylene oxide ring such as ethylene oxide, propylene oxide or butylene oxide may be used, or a chlorohydrin, such as ethylene chlorohydrin or glycerine-1-chlorohydrin, may be employed.

The various etherification agents may be reacted with the cellulose simultaneously or in any order desired. It is also possible to isolate the single intermediates and to continue the further reactions after a new addition of alkali. The etherification agents may be employed in an excess or in molar proportion or in a lesser amount based on the amount of the sodium hydroxide, the reaction being continued until the whole amount of alkali is used up or stopped after the desired degree of etherification has been reached. If the reaction is to be carried out in the presence of an excess of alkali it is especially advantageous to effect the oxalkylation with the aid of alkylene oxides in a first step since in this case no alkali is used.

The mixed cellulose ethers thus obtained are soluble in cold water and coagulate on heating if the total degree of etherification amounts to 1.3 to 2.5 per glucose unit of the cellulose. In the case of methyl hydroxy ethyl allyl ether this consists of 0.3 to 1.4 methyl groups, 0.6 to 1.4 oxyethyl groups and 0.1 to 0.8 allyl groups. Particular advantages with respect to solubility and ease of recovery have mixed ethers with a total etherification degree in the case of methyl hydroxyethyl allyl ethers of 1.6 to 2.0, these figures comprising 0.5 to 0.9 methyl groups, 0.7 to 0.9 oxyethyl groups and 0.3 to 0.6 allyl groups.

Mixed ethers within the preferred substitution range are e.g. obtained by the following procedure: an alkali cellulose containing 1.0 to 3 moles of alkali per 1 mole of cellulose is reacted with 1.2 to 3 moles of ethylene oxide and, subsequently, with 0.7 to 3.0 moles of chloromethyl, the chloromethyl preferably not being employed in excess over the alkali. Subsequently, the product obtained is reacted wtih an excess of allyl halide in the presence of 0.45 to 1.5 moles of alkali. If less than 0.45 mole of alkali per mole of cellulose are present before the allylation reaction takes place, the alkali content of the etherification product is to be raised to at least 0.45 mole per mole of cellulose by the addition of alkali. Alternatively, an alkali cellulose containing 1.2 to 5.0 moles of alkali can be reacted in one operation with 1.2 to 4.5 moles of ethylene oxide, 0.7 to 3.0 moles of methyl chloride and 0.45 to 2.0 moles of allyl halide, the methyl chloride and the allyl halide preferably not being present in an excess over the sodium hydroxide. If the alkyl halides are employed in excess, only 1.1 to 4.0 moles of alkali are required. Of the latter etherification agents, the slower reacting component is employed in an excess over the faster reacting component.

Another possibility is the methylation of an alkali cellulose containing from 0.8 to 2.2 moles of alkali with an excess of methylchloride, based on the alkali. The crude or purified reaction product is again mixed with 1.0 to 2.0 moles of alkali and then reacted, either simultaneously or successively, with 0.9 to 2.2 moles of ethylene oxide and 0.45 to 2.0 moles of allyl halide.

Etherification is advantageously performed at elevated temperature, the reactants being thoroughly mixed by means of a stirrer or kneader or on helices at temperatures between about 30° and 150° C., preferably between 40° and 100° C. Gradually increasing temperatures may be applied, e.g. the hydroxyethylation step may be conducted at relatively low temperatures, e.g. between 30° and 50° C. and subsequently the methylation or allylation at a higher temperature range, e.g. between 50° and 100° C. Furthermore it may be advantageous to conduct the reaction at increased pressure, e.g. at a pressure of 2 to 20 atmospheres above atmospheric pressure or more, if desired, in the presence of an inert gas such as nitrogen. The reaction period is between 1 and about 10 hours, depending on the reaction conditions applied.

In order to obtain a uniform reaction it is advisable in many cases to conduct the reaction in the presence of a solvent which may contain small quantities of water. Suitable solvents are e.g. aromatic or aliphatic hydrocarbons, aliphatic alcohols containing up to 5 C-atoms as well as ketones. Mixtures of such solvents can also be employed, if desired, with addition of water.

After the reaction has been completed, any excess of etherification agent or solvent which may be present in the reaction mixture is cautiously drawn or distilled off and if the residue is alkaline it is neutralized by means of an acid, preferably acetic acid, and the salts formed by the reaction are removed by washing with hot water. Thereafter the reaction products are dried in suitable dryers, if desired by applying a vacuum.

The mixed cellulose ethers of the present invention are soluble in water at room temperature and above up to about 40° C. in spite of their relatively high allyl content. Since, on the other hand, they are insoluble in water of 90° C. in spite of their relatively high hydroxyethyl content they have the great advantage that no organic solvents are required for their isolation but that water can be used.

Owing to their high allyl content they can be converted into substantially insoluble products by the addition of suitable catalysts or by heating.

Conventional peroxide catalysts such as potassium persulphate, benzoylperoxide, and cumene peroxide, or redox catalysts such as potassium persulphate/sodiumsulphite are employed as catalysts to be added to the aqueous solutions of the mixed cellulose ethers. When such catalysts are added to the aqueous solutions in quantities ranging from about 2 to about 5 percent, based on the cellulose ether, the solutions solidify to form a gel after a short time. By adding smaller amounts of catalysts, the solutions may be kept in a liquid state for a prolonged period of time. If poured on plain surfaces or brushed on walls, these solutions, after drying, yield firm films which are insoluble in water.

Owing to these properties, the products can advantageously be employed in the painting and printing industry, in the field of adhesives, and for obtaining water resistant impregnations, e.g. for fabrics.

The invention will be further illustrated by reference to the following specific examples:

*Example I*

100 parts by weight by cellulose powder are uniformly mixed in a mixer with 125.5 parts by weight of 20 percent (by weight) sodium hydroxide solution and then reacted in an autoclave at 85° C. with methyl chloride in excess, based on the amount of alkali used. The reaction is continued until the alkali is completely used up which takes about one hour. After removal of the remaining methyl chloride the reaction product is washed free of salts with hot water and then dried.

53 parts by weight of the purified and dried methyl cellulose are made alkaline with 48 parts by weight of 30 percent (by weight) sodium hydroxide solution in the presence of 150 parts by volume of isopropanol. After addition of 13.4 parts by volume of ethylene oxide the reaction mixture is maintained for three hours at 30° C. while it is continuously mixed. Then 18 parts by volume of allyl bromide are added and the mixture is thoroughly mixed for two hours at 60° C. When the reaction is completed the crude product is neutralized with glacial acetic acid, washed free of salts with water of 90°–100° C. and subsequently dried. Approximately 50 parts by weight of a mixed ether are obtained with a content of 0.7 methyl group, 0.86 hydroxyethyl group and 0.47 allyl group per glucose unit. When water of a temperature of 20° C. is added, the mixed ethers yield a clear, highly viscous solution which polymerises upon addition of potassium persulphate/sodium sulphite.

*Example II*

62 parts by weight of air-dried cellulose are stirred for one hour with 60 parts by weight of 25 percent (by weight) sodium hydroxide solution in the presence of 240 parts by weight of butanol and heated to 60° C. for six hours after addition of 42.8 parts by weight of propylene oxide. After cooling the reaction product is neutralized with glacial acetic acid, drawn off, washed free of salts with 90 percent methanol and dried. The cellulose hydroxypropyl ether obtained contains about 0.6 hydoxypropyl group per glucose unit.

41 parts by weight of the purified and dried cellulose ether are uniformly mixed with 40 parts by weight of 24 percent (by weight) sodium hydroxide solution in a suitable mixer and subsequently reacted in a pressure vessel at 85° C. with an excess of methyl chloride, based on the amount of alkali employed, until the alkali has been completely reacted. After removal of the remaining methyl chloride, 33 parts by weight of 30 percent (by weight) sodium hydroxide solution are uniformly stirred in and the reaction mixture is heated for two hours at 60° C. with excessive allyl bromide, based on the amount of alkali used, while it is continuously agitated. After the reaction has been completed, the excess allyl bromide is distilled off and the reaction product is washed free of salts with hot water. Approximately 40 parts by weight of a polymerisable mixed ether are obtained which yields a highly viscous solution in water and contains about 0.6 hydroxypropyl group, 0.7 methyl group and 0.5 allyl group per glucose unit.

*Example III*

With continuous stirring and at 30° C., 75 parts by weight of gaseous ethylene oxide are introduced within 2½ hours in a suitable pressure vessel into 390 parts by weight of an alkali cellulose containing 41.5 percent of cellulose, 12.3 percent of sodium hydroxide and 46.2 percent water. After further agitation for three hours at 30° C. about 645 parts by weight of ethyl chloride are added and the reaction mixture is heated for 1½ hours to 110° C. After removal of the excess ethyl chloride the reaction product is washed free of salts with hot water and dried.

110 parts by weight of the purified and dried mixed ether are made alkaline with 40 parts by weight of 30 percent (by weight) sodium hydroxide solution in the presence of 250 parts by volume of isopropanol and heated for two hours to 80° C. with about 110 parts by weight of allyl chloride. Subsequently the excessive allyl chloride is distilled off, the reaction product is washed with hot water and dried. Approximately 105 parts by weight of a polymerisable mixed ether are obtained which is soluble in water yielding a highly viscous solution and contains 0.84 hydroxyethyl group, 0.42 ethyl group, and 0.3 allyl group per glucose unit.

*Example IV*

114 parts by weight of air-dried cellulose are stirred for one hour with 1,000 parts by volume of isopropanol and 187 parts by weight of 18 percent (by weight) sodium hydroxide solution. 750 parts by volume of isopropanol are drawn off by means of a suction filter and the remaining alkaline cellulose is stirred in an autoclave with 46 parts by weight of ethylene oxide. The mixture is maintained for three hours at 20° C. and for one hour at 30° C. Then 440 parts by weight of methyl chloride are introduced under pressure. With continuous agitation the mixture is heated to 85° C. and maintained at this temperature for one hour. After this period of time the excessive methyl chloride is drawn off as a gas thus cooling the mixture. After addition of 63 parts by weight of 40 percent (by weight) sodium hydroxide solution and agitation for one hour, 250 parts by weight of allyl chloride are introduced under pressure. The mixture is again heated to 80° C. and maintained at this temperature for two hours with agitation. After this period of time the reaction is completed. The excessive allyl chloride is distilled off under heating and the residual reaction mixture is slurried in water at 90° C. It is drawn off, washed repeatedly with water of 90° C. and dried. The mixed ether obtained in this manner contains about 0.8 mole of hydroxyethyl group, 0.8 mole of methyl group and 0.3 mole of allyl group. It is soluble in water and can be polymerized.

*Example V*

170 parts by weight of air-dried pulverized cellulose are stirred with 200 parts by weight of 30 percent (by weight) sodium hydroxide solution for half an hour in the presence of 500 parts by volume of 88 percent isopropanol and, after addition of 48.5 parts by weight of ethyleneoxide, heated at 30° C. for four hours. The resulting crude product of hydroxyethyl cellulose is mixed with 93.4 parts by weight of 30 percent (by weight) sodium hydroxide solution and, under constant stirring, heated at a temperature of 80° C. in an autoclave together with 150 parts by weight of methylchloride and 230 parts by weight of allyl chloride. After the reaction is completed, the excess of etherification agents and the isopropanol are distilled off and the crude product is washed free of salts with hot water at 90° C. The resulting ether is dried at 60° C. About 180 parts by weight of a mixed cellulose ether are formed which forms a clear solution in water and contains 0.74 hydroxyethyl group, 0.77 methyl group and 0.37 allyl group per glucose unit.

*Example VI*

170 parts per weight of air-dried pulverized cellulose are mixed for half an hour in a suitable mixer with 213 parts by weight of 30 percent (by weight) sodium hydroxide solution and reacted with 66 parts by weight of ethylene oxide in the conventional manner over a period of 4½ hours at 30° C. The resulting dry hydroxy ethylcellulose is then heated for ½ hour at 80° C. with 153 parts by weight of allyl chloride and 150 parts by weight of methyl chloride in an autoclave under constant mixing. After the reaction has been completed the excess of etherification agent is distilled off and the crude product is washed with water of 90° C. until it is free of salts. The ether is dried at 60° C. Approximately 170 parts by weight of a mixed cellulose ether are formed which contains 0.9 hydroxyethyl group, 0.57 methyl group and 0.57 allyl group per glucose unit and forms a clear solution in water.

What is claimed is:

1. A mixed ether of cellulose which is soluble in water at room temperature and above up to about 40° C. but insoluble in water at 90° C., containing from 0.3 to 1.4 lower alkyl groups, from 0.6 to 1.4 lower oxyalkyl groups, and from 0.1 to 0.8 allyl group per glucose unit of the cellulose ether, the total degree of etherification being from 1.3 to 2.5 ether groups per glucose unit of the cellulose ether.

2. A mixed ether of cellulose according to claim 1 in which the lower alkyl groups are selected from the group consisting of methyl and ethyl.

3. A mixed ether of cellulose according to claim 1 in which the lower oxyalkyl groups are selected from the group consisting of oxyethyl and oxypropyl.

4. A mixed ether of cellulose which is soluble in water at room temperature and above up to about 40° C. but insoluble in water at 90° C., containing from 0.3 to 1.4 methyl groups, from 0.6 to 1.4 oxyethyl groups, and from 0.1 to 0.8 allyl group per glucose unit of the cellulose ether, the total degree of etherification being from 1.3 to 2.5 ether groups per glucose unit of the cellulose ether.

5. A two-step process for the production of a mixed ether of cellulose which is soluble in water at room temperature and above up to about 40° C. but insoluble in water at 90° C., containing from 0.3 to 1.4 lower alkyl groups, from 0.6 to 1.4 lower oxyalkyl groups, and from 0.1 to 0.8 allyl group per glucose unit of the cellulose ether, which comprises etherifying not more than 2.5 OH groups per glucose unit of a cellulose by mixing, in the presence of a strong alkali and at a temperature not exceeding 150° C., an alkali-cellulose with at least one lower alkyl halide and at least one oxyalkylating agent selected from the group consisting of a lower alkylene oxide and a lower oxyalkyl halide to form a first reaction product, and then reacting said first reaction product at a temperature not exceeding 150° C. with at least one allyl halide.

6. A two-step process for the production of a mixed ether of cellulose which is soluble in water at room temperature and above up to about 40° C. but insoluble in water at 90° C., containing from 0.3 to 1.4 lower alkyl groups, from 0.6 to 1.4 lower oxyalkyl groups, and from 0.1 to 0.8 allyl group per glucose unit of the cellulose ether, which comprises etherifying not more than 2.5 OH groups per glucose unit of a cellulose by mixing, in the presence of a strong alkali and at a temperature not exceeding 150° C., an alkali-cellulose with at least one lower alkylene oxide to form a first hydroxyalkyl cellulose reaction product, and then reacting said first reaction product at a temperature not exceeding 150° C., with a mixture of at least one lower alkyl halide and at least one allyl halide.

7. A two-step process for the production of a mixed ether of cellulose which is soluble in water at room temperature and above up to about 40° C. but insoluble in water at 90° C., containing from 0.3 to 1.4 lower alkyl groups, from 0.6 to 1.4 lower oxyalkyl groups, and from 0.1 to 0.8 allyl group per glucose unit of the cellulose ether, which comprises etherifying not more than 2.5 OH groups per glucose unit of a cellulose by mixing, in the presence of a strong alkali and at a temperature not exceeding 150° C., an alkali-cellulose with a methyl halide and ethylene oxide to form a first reaction product, and then reacting said first reaction product at a temperature not exceeding 150° C., with an allyl halide.

8. A two-step process according to claim 5 which is conducted in the presence of a solvent selected from the group consisting of aromatic hydrocarbons, aliphatic hydrocarbons, aliphatic alcohols, ketones, ethers, and mixtures thereof.

9. A two-step process according to claim 5 which is conducted under superatmospheric pressure.

10. A two-step process according to claim 12 which is conducted in the presence of a solvent selected from the group consisting of aromatic hydrocarbons, aliphatic, hydrocarbons, aliphatic alcohols, ketones, ethers, and mixtures thereof.

11. A two-step process according to claim 12 which is conducted under superatmospheric pressure.

12. A two-step process for the production of a mixed ether of cellulose which is soluble in water at room temperature and above up to about 40° C., but insoluble in water at 90° C., containing from 0.3 to 1.4 lower alkyl groups, from 0.6 to 1.4 lower oxyalkyl groups, and from 0.1 to 0.8 allyl group per glucose unit of the cellulose ether, which comprises etherifying not more than 2.5 OH groups per glucose unit of a cellulose by mixing, in the presence of a strong alkali and at a temperature not exceeding 150° C., an alkali cellulose with a first reactant to form a first reaction product, then reacting said first reaction product at a temperature not exceeding 150° C. with a second different reactant and at least one allyl halide, and wherein said first and second reactants are selected from the group consisting of a lower alkyl halide and an oxyalkylating agent, the latter being selected from the group consisting of a lower alkylene oxide and a lower oxyalkyl halide.

References Cited by the Examiner

UNITED STATES PATENTS

| | | | |
|---|---|---|---|
| Re. 24,116 | 1/1956 | Klug | 260—231 |
| 1,879,742 | 9/1932 | Haller et al. | 260—231 |
| 2,082,797 | 6/1937 | Hahn | 260—231 |
| 2,336,985 | 12/1943 | Freund | 260—231 |
| 2,492,524 | 12/1949 | Darling | 260—231 |
| 2,949,452 | 8/1960 | Savage | 260—231 |
| 3,071,572 | 1/1963 | Haidasch | 260—231 |

OTHER REFERENCES

Ott et al.: Cellulose and Cellulose Derivatives, 2nd ed., Part II, pages 887–888.

WILLIAM H. SHORT, *Primary Examiner.*

A. H. WINKELSTEIN, *Examiner.*